March 17, 1931. W. G. PADEN 1,796,475
COVER FOR CLOSABLE CARRIERS
Filed Jan. 6, 1930
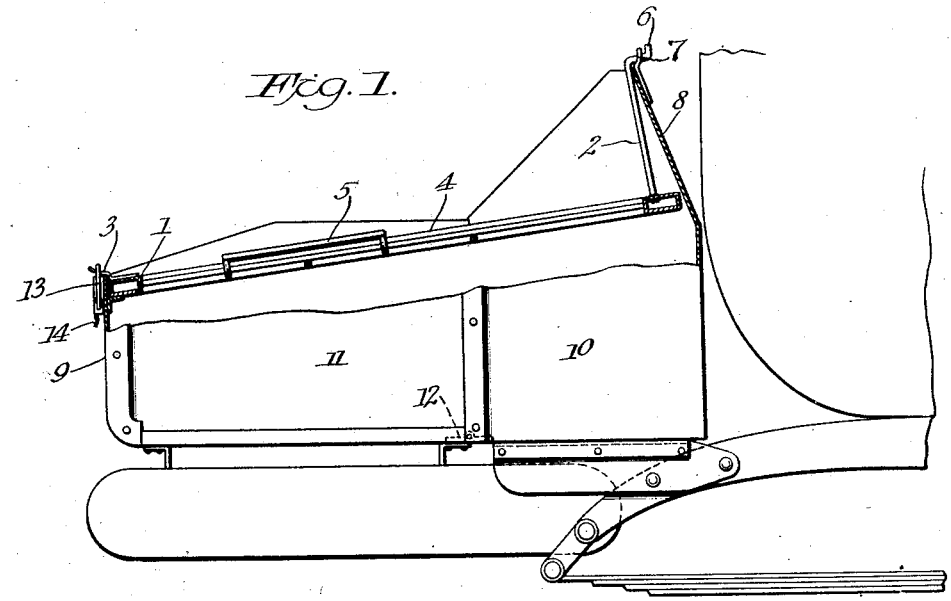
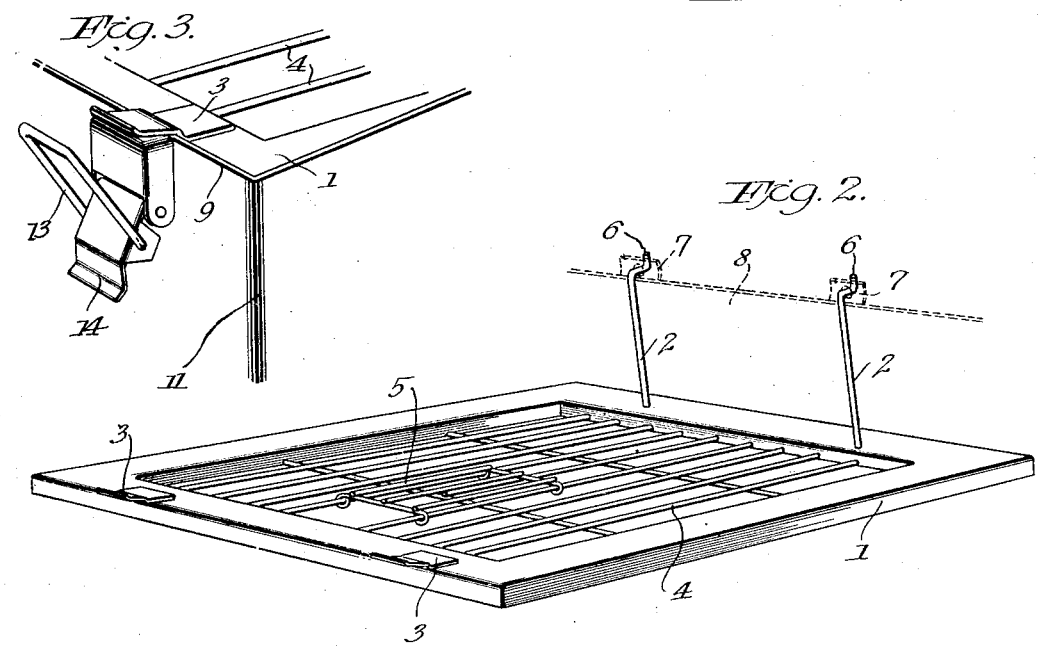
Inventor
William G. Paden
By Emery, Booth, Varney & Holcomb
his Attorneys Patented Mar. 17, 1931

1,796,475

UNITED STATES PATENT OFFICE

WILLIAM G. PADEN, OF ROGERS, NEBRASKA

COVER FOR CLOSABLE CARRIERS

Application filed January 6, 1930. Serial No. 418,913.

This invention relates to article carriers of the folding or telescoping type, and aims to provide a removable cover for such a carrier. Further aims are to provide a cover for a vehicle luggage carrier in its open or extended position that is easily and securely attached and readily removed from standard carriers and is of a simple but rugged construction.

By way of example the invention is illustrated and described as embodied in a cover for use in transporting live stock in one of the well known vehicle luggage carriers.

In the drawings:

Fig. 1 is a cross sectional view of a screen type of cover, showing it attached to the luggage carrier in its open position;

Fig. 2 is a view in perspective of the cover and its attaching means; and

Fig. 3 is an enlarged perspective view of the attaching tongues.

The vehicle luggage carrier shown in the drawings is of the well known type comprising two sections normally forming a trunk, the stationary section 10, being attached to the vehicle, and the movable section 11 being secured thereto by hinges 12 at the lower outer edge to swing down as shown in Fig. 1.

The cover constituting my invention is preferably formed of a sheet metal frame 1 provided with suitable hinge rods 2 at its back or inner edge and outwardly disposed latches or clips 3 at its forward or outer edge as seen from the rear of the vehicle. The frame supports a suitable wire mesh 4 with a sliding door 5 which can be provided with locking means, not shown, to secure it in its closed position over the opening.

The upwardly projecting metal suspension rods 2, attached to the opposite or rear end of the frame, have their upper ends 6 bent transversely at the proper angle to engage holes in the tongues 7 on the rear side wall 8 of the fixed folding luggage carrier member 10, thereby providing a pivoted hinged connection means between the cover 1 and the carrier member 10. Although the rods 2 are shown at a fixed angle and length, it is obvious that, within the scope of this invention, these rods could be made adjustable in length as well as in angle of inclination to suit the conditions of use.

The metal tongues 3 which are attached to the forward or outer edge of the frame are designed to overlie the edge of the upright end wall 9 of the swinging carrier member 11 and to interfit with the hasp 13 of the closure clasp 14 attached to the swinging member 11 for securing the two parts of the carrier together in closed position to simulate a trunk.

In operation, the luggage carrier is opened upon its hinges 12 so that the swinging member 11 is in the position shown in Fig. 1. The cover 1 is then placed inside the open carrier so that the bent ends 6 of the rods 2 can be inserted through the holes in the tongues 7 on the fixed member 10 of the carrier. This forms a hinged connection between the cover 1 and the carrier member 10, so that the cover can then be lowered until the tongues 3 rest on the edge 9 of the carrier member 11, and can be engaged by the two trunk closure shackles 13 at each corner of the carrier member 11, thus securely fastening the cover in place when the clasps 14 are clamped down.

To remove the cover, the clasps 14 are unfastened and the cover 1 is free to be swung upward on the hinged connection formed by the ends 6 of the rods 2 and the tongues 7 on the rear wall 8, until the front end of the cover is clear of the carrier, whereupon the ends 6 of the rods 2 can be disengaged from the holes in the tongues 7 and the entire cover removed. Thus the carrier may be closed when not in use.

The invention is not restricted to the particular shapes, dimensions and materials of construction of the device illustrated.

What I claim and desire to secure by Letters Patent is as follows:

1. A top closure for an automobile trunk of the character described having a bottom hinged side opening lid forming a box with an open top in open position and having upwardly projecting lugs at its fixed top edge and cooperating clasps on the adjacent edge of its hinged side; said top closure comprising suspension means adapted to engage said lugs, and lugs on said top closure adapted to be engaged by said clasps when the side is opened down.

2. A top closure for an automobile trunk of the character described having a bottom hinged side opening lid forming a box with an open top in open position and having upwardly projecting lugs provided with eyes or holes at its fixed top edge and cooperating clasps on the adjacent edge of its hinged side; said top closure comprising suspension means provided with bent ends adapted to engage the eyes or holes in said lugs and lugs on said top closure adapted to be engaged by said clasps when the side is opened down.

3. A top closure for open top carriers for automobiles comprising upstanding suspension means at one edge of said closure provided with hooks at their ends adapted to pivotally support said closure from said carrier and supporting fastenings at the opposite edge of said closure adapted to overlie an adjacent edge of said carrier.

4. A top closure for open top carriers for automobiles comprising upstanding suspension means at one edge of said closure provided with hooks at their ends adapted to pivotally support said closure from said carrier, and supporting fastenings at the opposite edge of said closure adapted to overlie an adjacent edge of said carrier, and having bent tips for engagement with clasps, secured upon said carrier.

5. An auxiliary cover for a luggage carrier of the kind wherein a swinging carrier section cooperates with a fixed carrier section so that when in the open position said sections will lie in juxtaposed position presenting upwardly open compartments; said auxiliary cover having hinge means adapted for removable connection with cooperating means on said fixed carrier section, and projecting tongues adapted for cooperation with latch means on said swinging carrier section.

6. In combination with a luggage carrier having body and cover sections hingedly connected together so that when open they will present juxtaposed upwardly open compartments; latch means on one of said sections and keeper means on the other of said sections; of an auxiliary cover for both of said open compartments comprising a frame, means on said frame cooperating with said keeper means to provide therewith a hinged connection for said cover, and means on said cover frame cooperating with said latch means for securely fastening said cover to said compartments.

In testimony whereof, I have signed my name to this specification.

WILLIAM G. PADEN.